(12) United States Patent
Heffernan et al.

(10) Patent No.: US 10,558,995 B2
(45) Date of Patent: Feb. 11, 2020

(54) VALUE MANAGEMENT SYSTEM

(75) Inventors: Tim Heffernan, Smithtown, NY (US); Rob Borucki, Mesa, AZ (US)

(73) Assignee: NCR Corporation, Atlanta, GA (US)

( * ) Notice: Subject to any disclaimer, the term of this patent is extended or adjusted under 35 U.S.C. 154(b) by 1125 days.

(21) Appl. No.: 13/193,852

(22) Filed: Jul. 29, 2011

(65) Prior Publication Data

US 2013/0030891 A1 Jan. 31, 2013

(51) Int. Cl.
*G06Q 30/00* (2012.01)
*G06Q 30/02* (2012.01)

(52) U.S. Cl.
CPC ..... *G06Q 30/0226* (2013.01); *G06Q 30/0227* (2013.01); *G06Q 30/02* (2013.01)

(58) Field of Classification Search
CPC .... G06Q 30/06; G06Q 30/02; G06Q 30/0282; G06Q 30/0233; G06Q 30/00; G06Q 30/0207; G06Q 30/0211; G06Q 30/0232; G06Q 30/0214; G06Q 30/0269; G06Q 30/0271; G06Q 30/0226
USPC ...... 705/14.1, 14.3, 14.33, 14.17, 41, 14.16, 705/14.25, 14.13, 14.27, 14.29, 14.32, 30, 705/14.11, 14.19, 14.28, 14.31, 14.66, 705/26.62, 14; 235/380, 492
See application file for complete search history.

(56) References Cited

U.S. PATENT DOCUMENTS

| | | | | |
|---|---|---|---|---|
| 5,192,854 A | * | 3/1993 | Counts | 235/375 |
| 5,923,016 A | * | 7/1999 | Fredregill et al. | 235/380 |
| 6,000,608 A | * | 12/1999 | Dorf | 235/380 |
| 6,138,911 A | * | 10/2000 | Fredregill et al. | 235/383 |
| 6,179,710 B1 | * | 1/2001 | Sawyer et al. | 463/16 |
| 6,189,787 B1 | * | 2/2001 | Dorf | 235/380 |
| 6,199,762 B1 | * | 3/2001 | Hohle | 235/492 |
| 6,266,647 B1 | * | 7/2001 | Fernandez | 705/14.14 |
| 6,339,765 B1 | * | 1/2002 | Maher | 705/41 |
| 6,450,407 B1 | * | 9/2002 | Freeman et al. | 235/492 |
| 6,467,685 B1 | * | 10/2002 | Teicher | 235/379 |
| 6,638,167 B1 | * | 10/2003 | Sawyer et al. | 463/26 |
| 6,889,198 B2 | * | 5/2005 | Kawan | 705/14.27 |
| 6,901,375 B2 | * | 5/2005 | Fernandez | 705/14.26 |
| 6,965,868 B1 | * | 11/2005 | Bednarek | 705/7.14 |
| 7,089,208 B1 | * | 8/2006 | Levchin et al. | 705/39 |
| 7,134,087 B2 | * | 11/2006 | Bushold | G06Q 20/20 705/14.27 |
| 7,152,042 B1 | * | 12/2006 | Arkes | G06Q 30/02 705/37 |
| 7,424,441 B2 | * | 9/2008 | George et al. | 705/14.27 |
| 7,546,254 B2 | * | 6/2009 | Bednarek | 705/26.1 |

(Continued)

*Primary Examiner* — Matthew L Hamilton
(74) *Attorney, Agent, or Firm* — Schwegman, Lundberg & Woessner

(57) ABSTRACT

A value management system which facilitates substantially real-time exchange of loyalty value during transactions. The value management system includes an exchange computer for acting as an intermediary between a loyalty member computer and a loyalty system on behalf of a loyalty member. The exchange computer is for storing login information of the loyalty member, for accessing a loyalty account of the loyalty member within the loyalty system using the login information, for determining a loyalty value associated with the loyalty account, for performing a transaction with the loyalty member involving a change in the loyalty value in exchange for other value, and for charging a fee from the loyalty member in return for the transaction.

12 Claims, 3 Drawing Sheets

(56) References Cited

U.S. PATENT DOCUMENTS

| | | | |
|---|---|---|---|
| 7,606,730 B2* | 10/2009 | Antonucci | 705/14.3 |
| 7,627,507 B1* | 12/2009 | Drakeley | G06Q 40/00 |
| | | | 705/35 |
| 7,716,080 B2* | 5/2010 | Postrel | 705/14.27 |
| 7,788,129 B2* | 8/2010 | Antonucci et al. | 705/14.3 |
| 7,862,425 B2* | 1/2011 | Cavagna | 463/25 |
| 7,908,216 B1* | 3/2011 | Davis et al. | 705/41 |
| 7,912,751 B1* | 3/2011 | Allos | 705/14.16 |
| 8,046,256 B2* | 10/2011 | Chien et al. | 705/14.33 |
| 8,113,948 B1* | 2/2012 | Coronel | 463/25 |
| 8,175,973 B2* | 5/2012 | Davis et al. | 705/41 |
| 8,195,507 B2* | 6/2012 | Postrel | 705/14.27 |
| 8,234,163 B2* | 7/2012 | Shaw et al. | 705/14.17 |
| 8,265,993 B2* | 9/2012 | Chien et al. | 705/14.33 |
| 8,285,588 B2* | 10/2012 | Postrel | 705/14.1 |
| 8,321,270 B2* | 11/2012 | Antonucci | 705/14.3 |
| 8,401,898 B2* | 3/2013 | Chien et al. | 705/14.33 |
| 8,423,401 B2* | 4/2013 | Antonucci et al. | 705/14.3 |
| 8,433,607 B2* | 4/2013 | MacLean et al. | 705/14.1 |
| 8,452,647 B2* | 5/2013 | Postrel | 705/35 |
| 8,452,651 B2* | 5/2013 | Postrel | 705/14.1 |
| 8,458,018 B1* | 6/2013 | Donelian et al. | 705/14.1 |
| 8,478,638 B2* | 7/2013 | Postrel | 705/14.1 |
| 8,478,639 B2* | 7/2013 | Antonucci | 705/14.3 |
| 8,489,449 B2* | 7/2013 | Teicher | 705/14.1 |
| 8,533,116 B2* | 9/2013 | Davis et al. | 705/41 |
| 2001/0054003 A1* | 12/2001 | Chien et al. | 705/14 |
| 2003/0050831 A1* | 3/2003 | Klayh | 705/14 |
| 2006/0116896 A1* | 6/2006 | Fowler | G06Q 10/00 |
| | | | 705/1.1 |
| 2007/0129955 A1* | 6/2007 | Dalmia et al. | 705/1 |
| 2007/0136493 A1* | 6/2007 | Linner | G06Q 30/02 |
| | | | 709/248 |
| 2007/0162335 A1* | 7/2007 | Mekikian | 705/14 |
| 2007/0239523 A1* | 10/2007 | Yi | G06Q 30/0207 |
| | | | 705/14.1 |
| 2008/0077500 A1* | 3/2008 | Linner | G06Q 30/0207 |
| | | | 705/14.1 |
| 2009/0106112 A1* | 4/2009 | Dalmia et al. | 705/14 |
| 2009/0112639 A1* | 4/2009 | Robinson Beaver | G06Q 10/02 |
| | | | 705/5 |
| 2010/0042517 A1* | 2/2010 | Paintin et al. | 705/30 |
| 2010/0088174 A1* | 4/2010 | Cohagan et al. | 705/14.33 |
| 2010/0257040 A1* | 10/2010 | Hunt | G06Q 30/02 |
| | | | 705/14.17 |
| 2010/0274815 A1* | 10/2010 | Vanasco | 707/798 |
| 2011/0270617 A1* | 11/2011 | Murta et al. | 705/1.1 |
| 2012/0035998 A1* | 2/2012 | Chien | G06Q 20/04 |
| | | | 705/14.17 |
| 2012/0278197 A1* | 11/2012 | Nguyen | G06Q 30/08 |
| | | | 705/26.3 |
| 2012/0310725 A1* | 12/2012 | Chien et al. | 705/14.33 |

* cited by examiner

VALUE MANAGEMENT SYSTEM

BACKGROUND

Customers earn loyalty credits for frequenting service providers. These credits appear in various units of measurement but most often take the form of "points" or, in the case of air travel, "miles".

Service providers assign a currency value to points. Most often, this value is used for internal accounting purposes. Often, points also have an external currency value, allowing marketers of related goods and services to purchase blocks of points to be offered to customers as incentives for ancillary purchases. For example, sometimes credit card providers allow customers to convert points to actual cash value on their statements, while others allow customers to donate to a charity which has a tax benefit.

Other types of programs have trapped value. For example, cell phone providers offer minutes of calling time. Gift card providers offer gift cards containing value exchangeable only with a particular provider.

For purposes of this application, the term "points" covers all forms of value including, but not limited to, loyalty points and miles.

Present day programs offer a limited number of ways to redeem and use points. Therefore, it would be desirable to provide a value management system that offers more ways to exchange and redeem points.

SUMMARY

A value management system is provided.

The value management system includes an exchange computer for acting as an intermediary between a loyalty member computer and a loyalty system on behalf of a loyalty member. The exchange computer is for storing login information of the loyalty member, for accessing a loyalty account of the loyalty member within the loyalty system using the login information, for determining a loyalty value associated with the loyalty account, for performing a transaction with the loyalty member involving a change in the loyalty value in exchange for other value, and for charging a fee from the loyalty member in return for the transaction.

DETAILED DESCRIPTION

Figure 1:
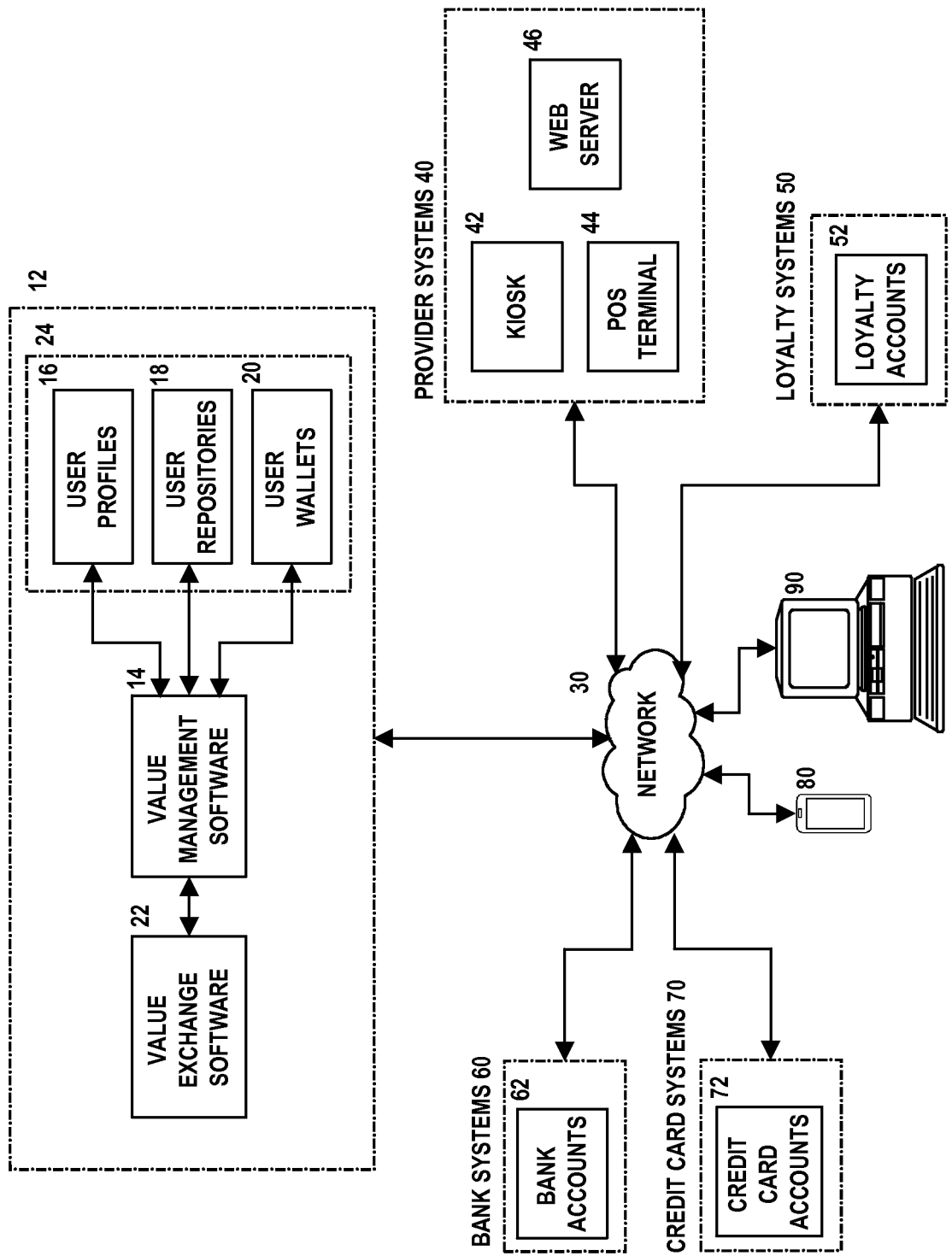
FIG. 1 is a block diagram of an example value management system.

Referring now to FIG. 1, example system 10 includes computer 12, which may include one or more computers.

Computer 12 includes a processor, memory, and program and data storage. Computer 12 may execute an operating system such as a Microsoft operating system. Computer 12 further include graphics circuitry for connecting to a display, network circuitry for connecting to network 30, and other circuitry for connecting to other peripherals, such as a printer, a mouse, and a keyboard.

Computer 12 may include a web server connected to the World Wide Web (WWW or "web") and provide web content, including web pages. Value management system 10 may also be capable of sending and receiving messages, including but not limited to electronic mail (e-mail) messages and Short Message Service messages (text messages).

Computer 12 executes value management software 14. Value management software 14 creates user profiles 16, stores user data in user repositories 18, stores points and/or cash money value in user wallets 20, connects with loyalty systems 50 to manage loyalty accounts 52 on behalf of users, and interacts with value exchange software 22 to buy, sell, or exchange user points.

When a user logs into value management system 10 for the first time, value management software 14 instructs the user to create an account 24. Value management software 14 creates a new profile 16, a new repository 18, and a new wallet 20 associated with account 24, and stores user account information in user profile 16. Users may later update their profiles 16.

The user may be instructed to choose a unique user identifier and a password and then may be asked to input loyalty account information for loyalty accounts 52, including account numbers, user identifiers, and passwords. Value management software 14 uses the loyalty account information to connect to loyalty systems 50, which are maintained by providers that offer loyalty programs.

Users connect to value management system 10 through network 30, which may include any combination of wireless or wired networks, including a global communication network, also known as the Internet.

Users may use any available computing and communication device, such as mobile communication device 80, or personal computer 90 to connect to value management system 10.

Provider systems 40 facilitate acceptance of points for goods or services offered by the providers. Providers register with value management system 10 to establish limited permission levels for checking and transferring customer points during transactions. Value management system 10 converts points received from customers into cash money value.

Provider systems 40 may include one or computers coupled to value management system 10 via network 30. For example, provider systems 40 may further include one or more of kiosk 42, point-of-sale or point-of-service (POS) terminal 44, and server computer 46 for completing sales of goods or services. Server computer 46 may include a web server with web pages for completing a transaction with mobile communicating device 80 or personal computer 90.

Providers of goods and/or services may offer loyalty programs 50. Some providers may not have loyalty programs but nevertheless accept points in exchange for goods and/or services.

Loyalty systems 50 determine when points are earned, credit earned points to user loyalty accounts 52, and debit points from user loyalty accounts 52. Loyalty systems 50 may include one or computers coupled to value management system 10 via network 30.

Example providers that do offer loyalty programs and maintain loyalty systems 50 on behalf of users include airlines, hotels, rental car companies, amusement parks, and credit card companies. Other companies are also envisioned.

Value management software 14 further maintains user repositories 18 as part of user accounts 24. User repositories 18 may contain information regarding user transactions that earned points and user transactions that spent or exchanged points from providers with loyalty systems 50. User repositories 18 may further include loyalty account information and statuses, bank account and credit card account information, including credit card rates, to facilitate exchange of points to and from cash money value. Cash money value may be deposited in or withdrawn from bank accounts 62 via bank systems 60. Cash money value may also be charged to credit card accounts 72 via credit card systems 70.

Bank systems 60 and credit card systems 70 may include one or computers coupled to value management system 10 via network 30.

User repositories 18 are searchable and the resulting data can be sorted. Examples of data searched may include but not be limited to credit card transactions, airline transactions, hotel transactions, and rental car transactions.

In an example embodiment, a user would authorize value management system 10 to search, mine, use, and share repository data with value management system 10, loyalty systems 50, and provider systems 40.

Value management system 10 facilitates action of a Market Maker in order to broker point exchanges between one user or company to another user or company. For example, value management system 10 may complete the transfer of airline miles from one user to another user. The users may not necessarily be members of the same airline loyalty program.

A market maker is defined for this purpose as a company holding points of member users that quotes both a buy price and a sell price for the points. Prices may be reflected in any financial currency, or in any commodity held that could be converted into points. The Market Maker makes a profit on the bid-offer spread or "turn."

For this purpose, value management system 10 executes value exchange software 22, which accepts bids and offers for points. Value exchange software 22 also keeps the spread or difference between the bid and offer. The bid-offer spread is the difference between the price quoted by value exchange software 22 for an immediate sale (bid) and an immediate purchase (ask). The size of the bid-offer spread is a measure of the liquidity of the market and the size of the transaction cost. The more demand for points, the lower the spread is between the bid and ask prices. The less demand for points, the higher the spread is between the bid and ask prices.

Value exchange software 22 may exchange points based upon a common currency, such as United States dollars. Users may request that there points from different programs be converted to and from the common currency.

Value exchange software 22 may exchange points into a common point system, or exchange points. Exchange points have a value in the common currency.

If users sell points, value exchange software 22 may transfer the proceeds from the sale in the common currency to user bank accounts. Using value exchange software 22, users may additionally sell points, converting them into the common currency, to make other purchases.

If users purchase points, value exchange software 22 may charge user credit card accounts 70 for the cost of the purchase in the common currency.

If users exchange points in one program for those of another, value exchange software 22 may establish exchange rates based upon the common currency for the different points.

For example, a user may wish to convert points from a first airline into points of a second airline for the purpose of purchasing a flight with the second airline, or purchasing some other good or service from the second airline, such as a baggage fee.

Value exchange software 22 may broker the transfer by first converting the points from the first and second airlines into first and second amounts of exchange points while maintaining a spread, e.g., 10,000 miles equals 9,975 exchange points. The user need not be aware of the transfer into exchange points.

Providers with loyalty programs may participate with value management system 10 to provide directed offerings of goods or services based upon point exchanges and trading. These providers must agree to allow their points to be exchanged and/or converted into a currency. Value exchange software 22 implements the exchange of points for the goods or services. For example, airline passengers could exchange points for baggage fees.

Providers without loyalty programs may also participate to allow points to be exchanged and/or converted into a currency. It is envisioned that assisted-service computer systems and/or self-service computer systems would be equipped to handle alternative payment using points.

For example, a participating restaurant may allow airline passengers to exchange points for food at the participating restaurant. It is envisioned that food ordering systems at the restaurant would be equipped to handle alternative payment using points. The participating restaurant would exchange points received as payment for a value of common currency.

As another example, a participating grocery may allow customers to exchange points for goods at the participating grocery. It is envisioned that checkout systems at the grocery would be equipped to handle alternative payment using points. The participating restaurant would exchange points received as payment for a value of common currency.

Value management system 10 also scores customers based upon demographics, loyalty, purchases and credit history.

It is envisioned that service providers would be able to see points data of other service providers that have exchanged points with a user and thus contribute to a common customer scoring method. Service providers may use the same scoring method to rate its other customers and to acquire new customers.

For example, if one airline could see the elite status of a customer with another airline, the one airline could use value management system 10 to generate pre-approved offers to lure that customer to change providers.

This is commonly known in the industry as a "challenge." An elite customer calls another service provider to get the benefits of elite status prior to achieving elite status through conventional means under the frequent flyer program. The user does this by calling the provider and stating that they are willing to switch brands if they are offered the elite status offered by their current brand of choice. The user then usually has to prove this by emailing or faxing proof of that status, usually through a statement, and then completing a certain amount of stays, flights, miles, points, etc. within a certain amount of time to maintain that status. The system above would automate this process and targeting of high value customers for the providers.

Any provider could set up offers where they could reward customers based upon future activity. For example, if a customer only had enough points for 3 days of hotel stay, the provider could give options to the user for ways to extend additional days either through payment, exchange of other points or challenges as described above.

Figure 2:
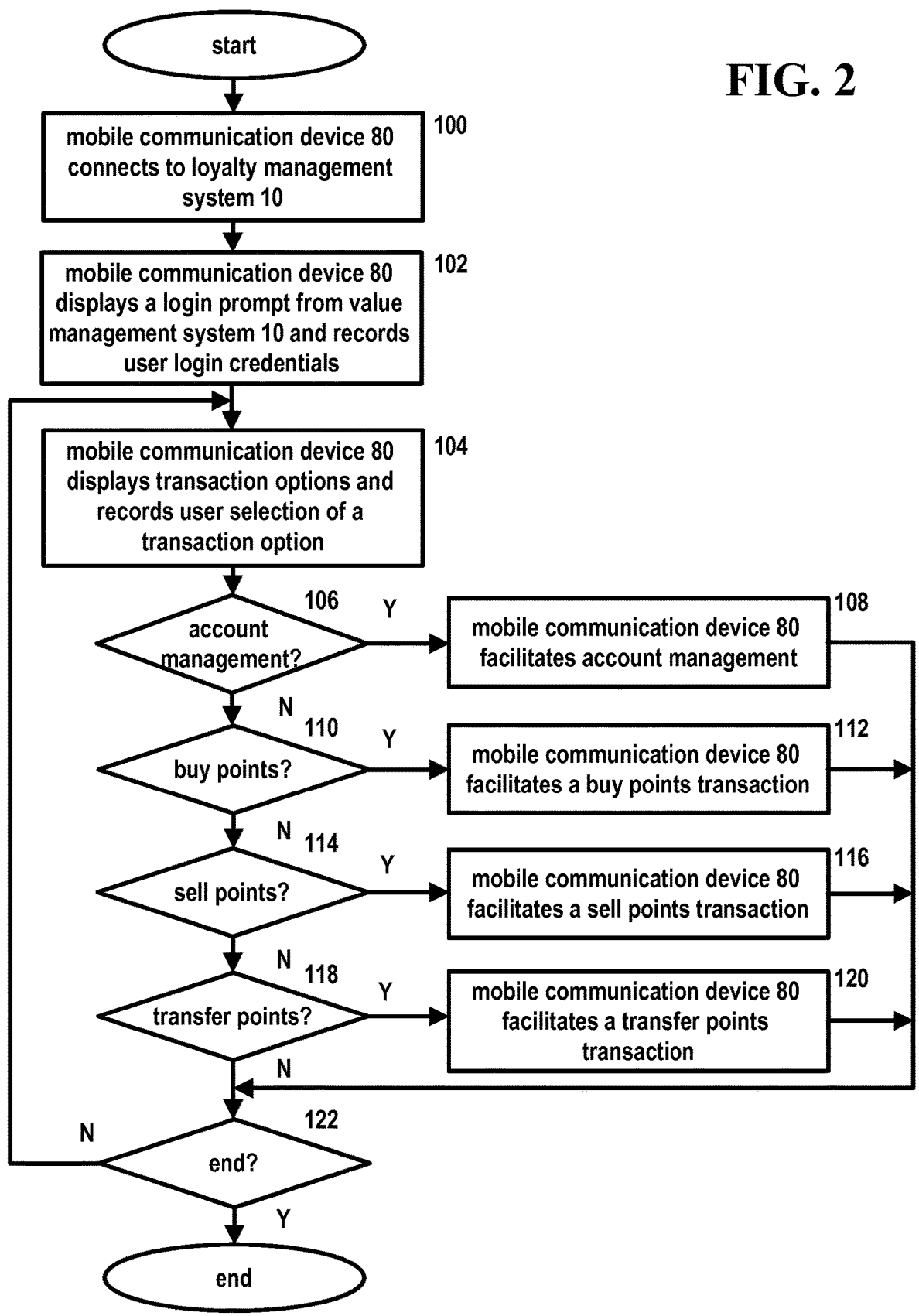
FIG. 2 illustrates an example operation of the value management system.

Referring now to FIG. 2, an example operation of value management system 10 is illustrated. In this example, a user operates mobile communication device 80; however, operation using personal computer 90 may be similar. Mobile communication device 80 is equipped with web browser software for downloading and displaying web pages of value management system 10, provider systems 40, and loyalty systems 50.

In step 100, mobile communication device 80 connects to loyalty management system 10 under user control. Mobile communication device 80 executes web browser software under user control, and the user enters or otherwise selects the address or uniform resource locator (URL) of the loyalty management system web site.

In step 102, mobile communication device 80 displays a login prompt from value management system 10 and records user login credentials. If a user is a new user without an account, then value management system 10 creates a new account, including a user profile 16, user repository 18, and user wallet 20.

In step 104, mobile communication device 80 displays transaction options such as account management, buy points, sell points, and transfer points and records user selection of one of the transaction options.

If the user selects "account management" in step 106, mobile communication device 80 facilitates account management in step 108. For example, mobile communication device 80 may display options for changing user profile 16, viewing user repository 18, viewing user wallet 20, withdrawing money or points, and depositing money or points.

If the user elects to buy points in step 110, mobile communication device 80 may facilitate a buy points transaction in step 112. Mobile communication device 80 may display transaction options for buying points and record user selections. Mobile communication device 80 may then display fields for entering or selecting the number of points desired to buy, a desired purchase price, and the method of payment, such as credit card, Pay Pal account, direct charge against a bank account, or other method identified in user profile 16. If value management system 10 is able to satisfy the user's conditions for purchase, value management system 10 processes payment and alerts the purchaser that the buy order has been completed. Mobile communication device 80 may display verification that desired points have been added to user wallet 20.

If the user elects to sell points in step 114, mobile communication device 80 may facilitate a sell points transaction in step 116. Mobile communication device 80 may display transaction options for selling points and record user selections. Mobile communication device 80 may then display fields for entering or selecting the number of points desired to sell, a desired sale price, and preferred method of depositing proceeds from the sale, such as direct deposit to a bank account, or other method identified in user profile 16. If value management system 10 is able to satisfy the user's conditions for sale, value management system 10 completes the sale, and alerts the seller that the sell order has been completed. Mobile communication device 80 may display verification that desired points have been removed from wallet 20.

If the user elects to transfer points to another user in step 118, mobile communication device 80 may display options for transferring points to another user in step 120. For example, one user may wish to transfer frequent flyer miles from a loyalty system 50 to another user. As another example, one user may wish to transfer points to a charity, the charity then selling the points for cash money.

Mobile communication device 80 may display fields for entering or selecting the number of points desired to transfer, the desired recipient user, and the fee for the transfer. Value management system 10 completes the transfer, processes payment using bank account information in user profile 16, and alerts the user that the order has been completed. Mobile communication device 80 may display verification that desired points have been removed from wallet 20.

Inherent in the exchange rate are any fees due for using value management system 10. Alternatively, value management system may charge a separate transaction fee.

Figure 3:
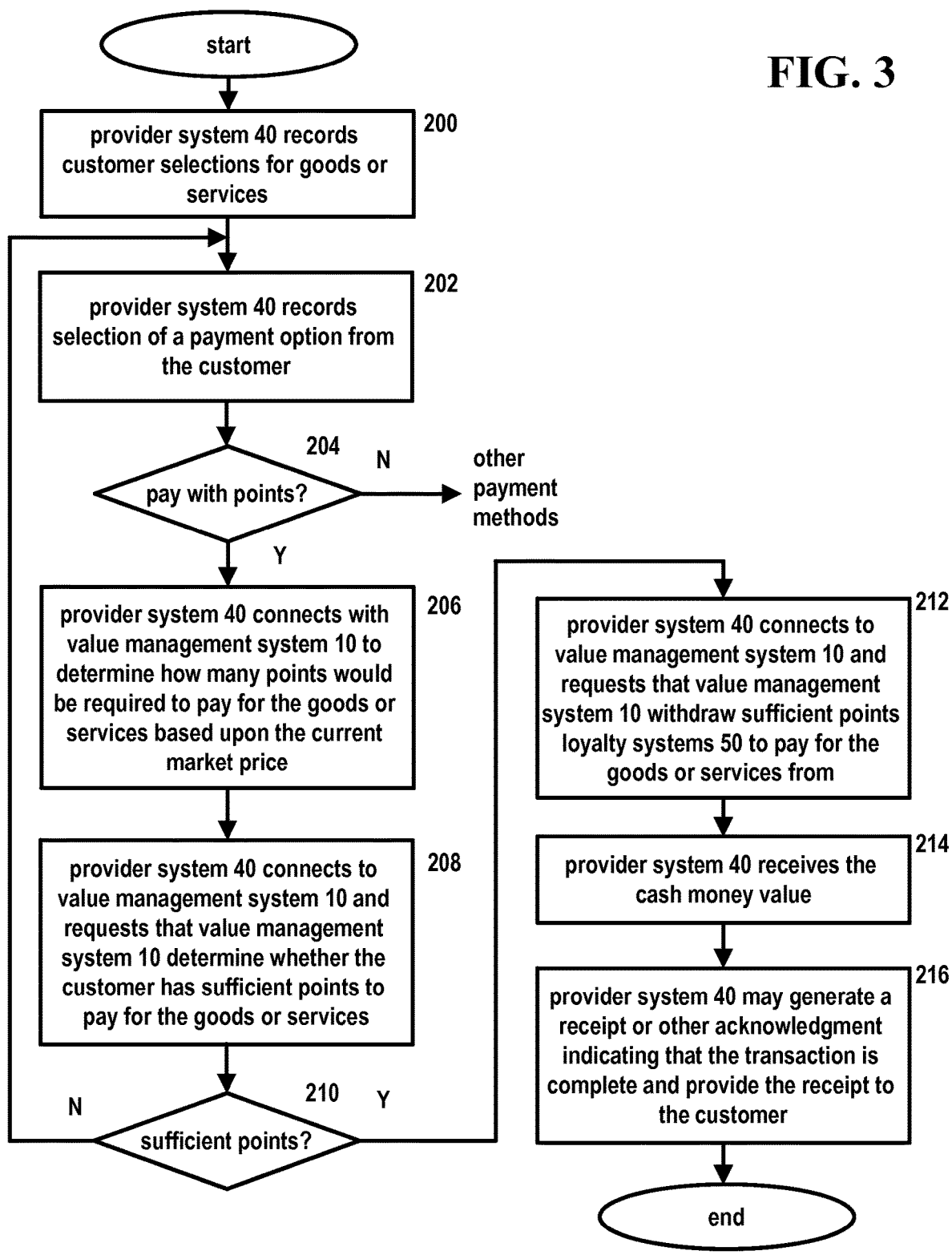
FIG. 3 illustrates an example transaction method involving operation of the value management system and a provider system.

With reference to FIG. 3, an example transaction method involving operation of value management system 10 and provider system 40 is illustrated. In this example, value management system 10 facilitates a transaction in which a user exchanges points from one or more loyalty systems 50 for goods or services sold by a provider. The provider may or may not have a loyalty system 50 and the points being exchanged may be from the provider loyalty system or from other loyalty systems 50 of other providers.

An example transaction may be implemented by a provider POS terminal 42, a provider kiosk 44, or remotely using mobile communication device 80 or personal computer 90 as a web-based transaction with provider system 40.

In step 200, provider system 40 records customer selections for goods or services. Selections may be made by a user as a self-service transaction or by an assistant as an assisted transaction.

In step 202-204, provider system 40 records selection of a payment option from the customer. If the customer chooses to pay with points, operation continues to step 206. A customer may further choose a particular type of points to use as payment and may also choose to pay with a combination of points and some other payment method, such as cash or credit from bank account 62 or credit card account 72.

In step 206, provider system 40 connects with value management system 10 to determine how many points would be required to pay for the goods or services based upon the current market price. Provider system 40 displays this information for the customer to consider in making a payment method decision from among different payment options. The provider has registered with value management system 10 in advance.

In steps 208-210, provider system 40 connects to value management system 10 and requests that value management system 10 determine whether the customer has sufficient points to pay for the goods or services. Value management system 10 accesses the customer's repository 18 to obtain loyalty account information and then connects to corresponding loyalty systems 50 to obtain points information.

The provider has registered with value management system 10 to establish limited permission levels for requesting checks of customer point totals and transfers of customer points during transactions. If value management system 10 determines that the customer has sufficient points, operation continues to step 212. Otherwise, operation returns to step 204.

In step 212, provider system 40 connects to value management system 10 and requests that value management system 10 withdraw sufficient points from loyalty systems 50 to pay for the goods or services. Value management system 10 connects to loyalty systems 50 and withdraws points to customer wallet 20. Value management system 10 converts the withdrawn points in customer wallet 20 to cash money value.

Inherent in the exchange rate are any fees due for using value management system 10. Alternatively, value management system may charge a separate transaction fee.

In step 214, provider system 40 receives the cash money value. Value management system 10 may transfer the cash money value to a provider bank account. Value management system 10 removes the cash money value from the customer wallet 20.

In step 216, provider system 40 may generate a receipt or other acknowledgment indicating that the transaction is complete and provide the receipt to the customer. For example, provider system 40 may provide the receipt as part of a web page and/or send the receipt to a customer email address. Value management system 10 may also generate a message to the customer indicating that points have been withdrawn in exchange for the transaction.

Advantageously, from the customer's perspective, the transaction occurs in real-time. Communications between provider system 40 and value management system 10, and between value management system 10 and one or more loyalty systems 50 occur in real-time.

Although particular reference has been made to certain embodiments, variations and modifications are also envisioned within the spirit and scope of the following claims.

The invention claimed is:

1. A server, comprising:
   a processor; and
   a non-transitory computer-readable storage medium having executable instructions representing a value management system;
   the value management system when executed by the processor from the non-transitory computer-readable storage medium cause the processor to:
      receive loyalty account information from a user, the loyalty account information comprising: an account number, user identification, and a password corresponding to a loyalty account associated with the user who is a loyalty member of a particular loyalty system;
      store the loyalty account information;
      receive an authorization from the user to search, mine, use, and share data with loyalty management systems and provider systems;
      receive a request from a mobile device operated by the user, wherein the mobile device executes a browser and accesses a Universal Resource Locator Link (URL) as a web page associated with the value management system;
      transmit a transaction web page comprising transaction options that include specific options for: account management, buying points, selling points, and transferring points;
      receive a selection criteria from the user of at least one of the specific options to: buy points, sell points, or transfer points in a certain amount of points;
      access, over a network, the loyalty account of the user utilizing the loyalty account information based on the authorization to access the particular loyalty system, without user intervention, and wherein the value management system and the loyalty systems are different systems; and
      transmit a notification of a completed transaction that satisfies the selection criteria to the mobile device.

2. The server of claim 1, wherein the value management system when executed by the processor from the non-transitory computer-readable storage medium is further configured to cause the processor to: determine a loyalty value associated with loyalty points of the loyalty account based upon a market value.

3. The server of claim 1, wherein the value management system when executed by the processor from the non-transitory computer-readable storage medium is further configured to cause the processor to: determine a loyalty value associated with loyalty points of the loyalty account in a money value.

4. The server of claim 1, wherein the value management system when executed by the processor from the non-transitory computer-readable storage medium is further configured to cause the processor to: determine an exchange rate for loyalty points in the loyalty account in terms of a currency, and wherein a portion of the exchange rate includes a fee.

5. The server of claim 1, wherein the completed transaction involves a purchase of additional loyalty points for the loyalty account.

6. The server of claim 1, wherein the completed transaction includes a purchase of the user from another loyalty member of the particular loyalty system.

7. The server of claim 1, wherein the completed transaction includes a sale of loyalty points from the loyalty account by the user.

8. The server of claim 1, wherein the completed transaction includes a user transaction between the user and a particular provider system of the provider systems.

9. A method, comprising:
   receiving, by a value management system, loyalty account information from a user, the loyalty account information comprising: an account number, user identification, and a password corresponding to a loyalty account associated with the user who is a loyalty member of a particular loyalty system;
   storing, by the value management system, the loyalty account information;
   receiving, by the value management system, an authorization from the user to search, mine, use, and share data with loyalty management systems and provider systems;
   receiving, by the value management system, a request from a mobile device operated by the user, wherein the mobile device executes a browser and accesses a Universal Resource Locator Link (URL) as a web page associated with the value management system;
   transmitting, by the value management system, a transaction web page comprising transaction options that include specific options for: account management, buying points, selling points, and transferring points;
   receiving, by the value management system, a selection criteria from the user of at least one of the specific options to: buy points, sell points, or transfer points in a certain amount of points;
   accessing, by the value management system through a network, the loyalty account of the user utilizing the loyalty account information based on the authorization to access the particular loyalty system, without user intervention, and wherein the value management system and the loyalty systems are different systems; and
   transmitting, by the value management system, a notification of a completed transaction that satisfies the selection criteria to the mobile device.

10. The method of claim 9 further comprising, charging, by the value management system, a fee to a value management system account associated with the user based on satisfying the selection criteria of the user.

11. The method of claim 9, wherein the transmitting the notification further includes interacting, by the value management system, with a particular provider system of the provider systems and providing payment value for at least a portion the completed transaction on behalf of the user, wherein the completed transaction is associated with the user purchasing a good or a service from the particular provider system.

12. The method of 9, wherein the transmitting the notification further includes interacting, by the value management system, with a particular provider system of the provider systems and providing a donation for the completed transaction on behalf of the user, wherein the completed transaction is associated with a charitable donation being made by the user to a charity associated with the particular provider system.

* * * * *